(12) United States Patent
Lee et al.

(10) Patent No.: US 10,416,022 B2
(45) Date of Patent: Sep. 17, 2019

(54) APPARATUS AND METHOD FOR MONITORING WATER LEVEL WITHIN PIPE

(71) Applicant: KOREA HYDRO & NUCLEAR POWER CO., LTD, Seoul (KR)

(72) Inventors: Seung Chan Lee, Daejeon (KR); Duk Joo Yoon, Daejeon (KR); Sang Jun Ha, Daejeon (KR)

(73) Assignee: KOREA HYDRO & NUCLEAR POWER CO., LTD, Seoul (KR)

( * ) Notice: Subject to any disclaimer, the term of this patent is extended or adjusted under 35 U.S.C. 154(b) by 197 days.

(21) Appl. No.: 15/523,194

(22) PCT Filed: Oct. 31, 2014

(86) PCT No.: PCT/KR2014/010328
§ 371 (c)(1),
(2) Date: Apr. 28, 2017

(87) PCT Pub. No.: WO2016/068360
PCT Pub. Date: May 6, 2016

(65) Prior Publication Data
US 2017/0314984 A1    Nov. 2, 2017

(30) Foreign Application Priority Data

Oct. 30, 2014 (KR) .................. 10-2014-0149431

(51) Int. Cl.
*G01F 23/296* (2006.01)
*G08B 21/18* (2006.01)
*G01S 15/88* (2006.01)

(52) U.S. Cl.
CPC ........ *G01F 23/296* (2013.01); *G01F 23/2961* (2013.01); *G01S 15/88* (2013.01); *G08B 21/18* (2013.01)

(58) Field of Classification Search
None
See application file for complete search history.

(56) References Cited

U.S. PATENT DOCUMENTS

| 5,438,868 A | 8/1995 | Holden et al. |
| 5,719,329 A * | 2/1998 | Jepson ..................... G01F 1/24 |
| | | 73/597 |

(Continued)

FOREIGN PATENT DOCUMENTS

| DE | 102005014987 | 11/2005 |
| JP | 0581657 | 11/1993 |

(Continued)

OTHER PUBLICATIONS

Extended European Search Report issued in EP Application No. 14904787.0 dated May 30, 2018.

(Continued)

*Primary Examiner* — Paul M. West
*Assistant Examiner* — Mark A Shabman
(74) *Attorney, Agent, or Firm* — McCarter & English, LLP; Steven G. Davis

(57) ABSTRACT

The present invention relates to an apparatus and method for monitoring the water level within a pipe. The present specification discloses a method for monitoring the water level in a pipe, comprising the steps of: transmitting ultrasonic waves generated at a plurality of ultrasonic transducers, which are spaced apart from each other in the outside of the pipe, to the inside of the pipe via a solid contact medium; checking whether echoes corresponding to respective ultrasonic waves are present; and determining the water level on the basis of the presence of the echoes corresponding to the respective ultrasonic waves. The present invention can sim- (Continued)

ply and conveniently install water level monitoring equipment within a pipe on a long term basis using a nondestructive method.

12 Claims, 6 Drawing Sheets

(56) References Cited

U.S. PATENT DOCUMENTS

| | | | | |
|---|---|---|---|---|
| 2009/0255345 | A1* | 10/2009 | Gysling | ............ G01F 1/662 73/861.25 |
| 2009/0272190 | A1 | 11/2009 | Hofmann | |
| 2010/0307263 | A1* | 12/2010 | Gysling | ............ G01F 1/662 73/861.25 |

FOREIGN PATENT DOCUMENTS

| | | |
|---|---|---|
| JP | 06281492 | 10/1994 |
| JP | H-11-211877 A | 8/1999 |
| JP | 2000329751 A | 11/2000 |
| JP | 2007263697 | 10/2007 |
| JP | 2010276593 | 12/2010 |
| JP | 2012132710 A | 7/2012 |
| JP | 2013213717 A | 10/2013 |
| JP | 2014503803 | 2/2014 |
| JP | 2014089142 | 5/2014 |
| KR | 20080011782 A | 2/2008 |
| KR | 20100004572 A | 1/2010 |
| KR | 100960228 B1 | 6/2010 |
| KR | 20110014767 A | 2/2011 |
| KR | 20120028127 A | 3/2012 |
| KR | 20130123940 A | 11/2013 |
| WO | 9739314 A1 | 10/1997 |
| WO | 2013063676 | 5/2013 |

OTHER PUBLICATIONS

Office Action issued in JP Application No. 2017-522537 dated Apr. 6, 2018.
Office Action (untranslated) issued by the Japanese Patent Office for corresponding JP Application No. 2017-522537, dated Mar. 1, 2019.

* cited by examiner

APPARATUS AND METHOD FOR MONITORING WATER LEVEL WITHIN PIPE

RELATED APPLICATIONS

This application is a 35 U.S.C. § 371 national stage filing of International Application No. PCT/KR2014/010328, filed on Oct. 31, 2014, which claims priority to Korean Patent Application No. 10-2014-0149431, filed on Oct. 30, 2014. The entire contents of each of the foregoing applications are incorporated herein by reference.

TECHNICAL FIELD

The present invention relates to an apparatus and method for monitoring a water level within a pipe and, more particularly, to an apparatus and method for monitoring a water level within a pipe in a nondestructive manner using the examination of ultrasonic waves and multiple channels.

BACKGROUND ART

In the case of a power plant, a gas accumulation phenomenon within a pipe of a safety-related system is emerging as a pending issue related to the safety of local and international power plants. Such a safety pending issue has been known to make it difficult to perform the safety function of a safety-related system in the power plant and also to cause a severe accident. In order to solve a pending issue related to the safety of the safety-related system in the power plant and to enhance the safety of the power plant, there has been essentially required a method for monitoring a water level within a pipe, which is capable of monitoring a water level within a pipe or a gas accumulation tendency.

In a conventional machine and system, methods for measuring a water level within a pipe include methods for measuring a water level using differential pressure or through the direct modification or improvement of the system, such as installing a water level system within a pipe. For example, a prior art includes Utility Model No. 200181636 (Device for detecting the water level of water sealvalve). However, such methods are inevitably accompanied by a process of dissembling a system or newly constructing a system in order to measure a water level within a pipe. That is, most of pending methods for monitoring a water level within a pipe have a burden because they are performed through the direct disassembly of a pipe or a modified design of the pipe, and they require a process that requires a lot of time taken to verify the integrity of a pipe. Accordingly, a corresponding approval and authentication process is touch.

A phenomenon related to the accumulation of gas within a pipe of a safety-related system is an important part from a viewpoint of the safety of a power plant. Accordingly, there is a need for a nondestructive and smooth method for monitoring a water level, which does not directly change a system.

DISCLOSURE

An object of the present invention is to provide an apparatus and method for monitoring a water level within a pipe in a nondestructive manner using the examination of ultrasonic waves and multiple channels.

Another object of the present invention is to provide an apparatus and method, which are capable of performing the monitoring of a gas accumulation phenomenon and the monitoring of a water level within a pipe without a direct change in the safety-related system of a nuclear power plant.

Yet another object of the present invention is to provide an apparatus and method for preventing the excessive accumulation of air within a pipe in a safety-related system, enhancing the safety of a power plant, and constructing a corresponding database by monitoring a water level within the pipe without changing the pipe.

In accordance with an aspect of the present invention, there is provided a system for monitoring a water level within a pipe. The system includes an ultrasonic generation unit including at least one ultrasonic transducer which is disposed at spaced locations on the outside of the pipe and generates an ultrasonic wave, a solid contact medium which is provided on one side of the at least one ultrasonic transducer and brings the at least one ultrasonic transducer into contact with the outside of the pipe, and a support unit which supports the at least one ultrasonic transducer so that the transducer fixedly comes into contact with the outside of the pipe, an ultrasonic examination unit which controls the generation of the ultrasonic wave by driving the at least one ultrasonic transducer, detects the reflective wave of the ultrasonic wave, collects information about the reflective wave, and inputs/outputs the information, and a data processing unit which determines a water level based on the information about the reflective wave and processes or stores the information about the water level.

In an embodiment, a plurality of ranges may be formed by a cross section of the pipe, based on a disposition of the at least one ultrasonic transducer in a vertical direction on the outside of the pipe, and the data processing unit may determine a range which belongs to the plurality of ranges and to which the water level belongs.

In another embodiment, the number of the at least one ultrasonic transducer may be 3, a first to third ultrasonic transducers may be sequentially disposed from the highest level to the lower side along the outside of the pipe, and the plurality of ranges may include a normal range, a warning range, and a danger range.

In yet another embodiment, when the ultrasonic examination unit detects all of the reflective waves of the ultrasonic waves of the first to third ultrasonic transducers or detects only the reflective waves of ultrasonic waves of the second and the third ultrasonic transducers, the data processing unit may determine that the water level belongs to the normal range.

In yet another embodiment, when the ultrasonic examination unit detects only the reflective wave of the ultrasonic wave of the third ultrasonic transducer, the data processing unit may determine that the water level belongs to the warning range.

In yet another embodiment, when the ultrasonic examination unit does not detect any of the reflective waves of the ultrasonic waves of the first to third ultrasonic transducers, the data processing unit may determine that the water level belongs to the danger range.

In yet another embodiment, the at least one ultrasonic transducer may be spaced apart in a horizontal direction on the outside of the pipe.

In yet another embodiment, the support unit may have an annular or a ring-shaped holder and may completely or partly surround the pipe.

In yet another embodiment, the solid contact medium may be an ultrasonic-transmissive solid material including a polyethylene series material, a material having a polymer characteristic, a metallic or metal material having softness or a hydrophilic polymer compound, and may be coated or attached on a surface of the pipe.

In accordance with another aspect of the present invention, there is provided a system for monitoring a water level within a pipe. The system includes an ultrasonic generation unit which transmits ultrasonic waves to the inside of the pipe through multiple separated channels, wherein each of the channels includes an ultrasonic transducer generating an ultrasonic wave, a solid contact medium provided on one side of the ultrasonic transducer, and a support unit having a ring shape that surrounds the outside of the pipe and fixedly supporting the ultrasonic transducer, an ultrasonic examination unit which controls the transmission of the ultrasonic waves through the multiple channels, detects the reflective waves of the ultrasonic waves, collects information about the reflective waves, and inputs/outputs the information, and a data processing unit which determines a water level based on the information about the reflective waves and processes or stores information about the water level.

In an embodiment, a plurality of ranges may be formed by a cross section of the pipe based on a disposition of the at least one ultrasonic transducer in a vertical direction on the outside of the pipe, and the data processing unit may determine a range which belongs to the plurality of ranges and to which the water level belongs.

In another embodiment, the number of the at least one ultrasonic transducer forming the multiple channels may be 3, a first to third ultrasonic transducers may be sequentially disposed from the highest level to the lower side along the outside of the pipe, and the plurality of ranges may include a normal range, a warning range, and a danger range.

In yet another embodiment, when the ultrasonic examination unit detects all of the reflective waves of the ultrasonic waves of the first to third ultrasonic transducers or detects only the reflective waves of ultrasonic waves of the second and the third ultrasonic transducers, the data processing unit may determine that the water level belongs to the normal range.

In yet another embodiment, when the ultrasonic examination unit detects only the reflective wave of the ultrasonic wave of the third ultrasonic transducer, the data processing unit may determine that the water level belongs to the warning range.

In yet another embodiment, when the ultrasonic examination unit does not detect any of the reflective waves of the ultrasonic waves of the first to third ultrasonic transducers, the data processing unit may determine that the water level belongs to the danger range.

In yet another embodiment, the at least one ultrasonic transducer may be spaced apart in a horizontal direction on the outside of the pipe.

In yet another embodiment, the solid contact medium may be a polyethylene-series ultrasonic-transmissive solid material and coated on a surface of the pipe.

In accordance with yet another aspect of the present invention, there is provided a method for monitoring a water level within a pipe. The method includes the steps of transmitting ultrasonic waves generated by a plurality of ultrasonic transducers spaced apart and disposed on the outside of the pipe to the inside of the pipe through a solid contact medium, checking whether the reflective wave of each of the ultrasonic waves is present or not, and determining a water level based on whether the reflective wave of each of the ultrasonic waves is present or not.

In an embodiment, a plurality of ranges may be formed by a cross section of the pipe based on a disposition of the at least one ultrasonic transducer in a vertical direction on the outside of the pipe. The determining step may include determining a range which belongs to the plurality of ranges and to which the water level belongs.

In yet another embodiment, the number of the plurality of ultrasonic transducers may be 3, a first to third ultrasonic transducers may be sequentially disposed from the highest level to the lower side along the outside of the pipe, and the plurality of ranges may include a normal range, a warning range, and a danger range.

In yet another embodiment, if it is checked that the reflective waves of the ultrasonic waves of the first to third ultrasonic transducers are present or only the reflective waves of the ultrasonic waves of the second and the third ultrasonic transducers are present in the checking step, the determining step may include determining that the water level belongs to the normal range.

In yet another embodiment, if it is checked that only the reflective wave of the ultrasonic wave of the third ultrasonic transducer is present in the checking step, the determining step may include determining that the water level belongs to the warning range.

In yet another embodiment, if it is checked that the reflective waves of the ultrasonic waves of the first to third ultrasonic transducers are not present in the checking step, the determining step may include determining that the water level belongs to the danger range.

In yet another embodiment, the at least one ultrasonic transducer may be spaced apart in a horizontal direction on the outside of the pipe.

In yet another embodiment, the solid contact medium may be an ultrasonic-transmissive solid material including a polyethylene series material, a material having a polymer characteristic, a metallic or metal material having softness or a hydrophilic polymer compound, and may be coated or attached on a surface of the pipe.

The present invention can construct water-level monitoring equipment within a pipe on a long term basis easily and simply through a nondestructive method, and can solve a pending issue related to the accumulation of gas and improve the safety and operation efficiency of a power plant.

Figure 1:
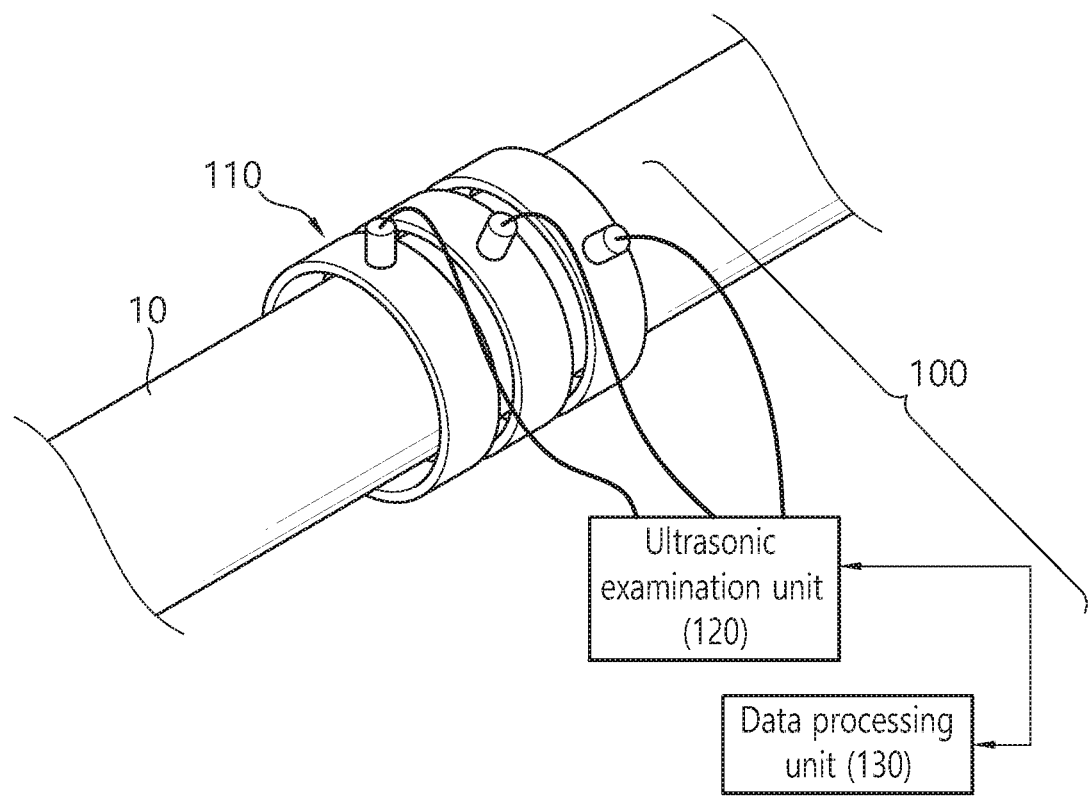
FIG. 1 shows the structure of a system for monitoring a water level within a pipe in accordance with an embodiment.

Hereinafter, embodiments of the present invention are described in detail with reference to the accompanying drawings so that a person having ordinary skill in the art to which the present invention pertains may easily practice the embodiments. However, the present invention may be modified in various different ways and is not limited to the embodiments described herein. Furthermore, in the drawings, in order to clarify a description of the present invention, a description of parts not related to the description is omitted, and similar reference numbers are used throughout the specification to refer to similar parts.

In the entire specification, when it is said that one element "include" the other element, the word "include" will be understood to imply the inclusion of stated elements but not the exclusion of any other elements, unless explicitly described to the contrary. Furthermore, the term " . . . unit" described in the specification means a unit for processing at least one function or operation, and this may be implemented by hardware or software or a combination of them.

FIG. 1 shows the structure of a system for monitoring a water level within a pipe in accordance with an embodiment.

Referring to FIG. 1, the system 100 for monitoring a water level within a pipe includes an ultrasonic generation unit 110, an ultrasonic examination unit 120, and a data processing unit 130.

Figure 2:
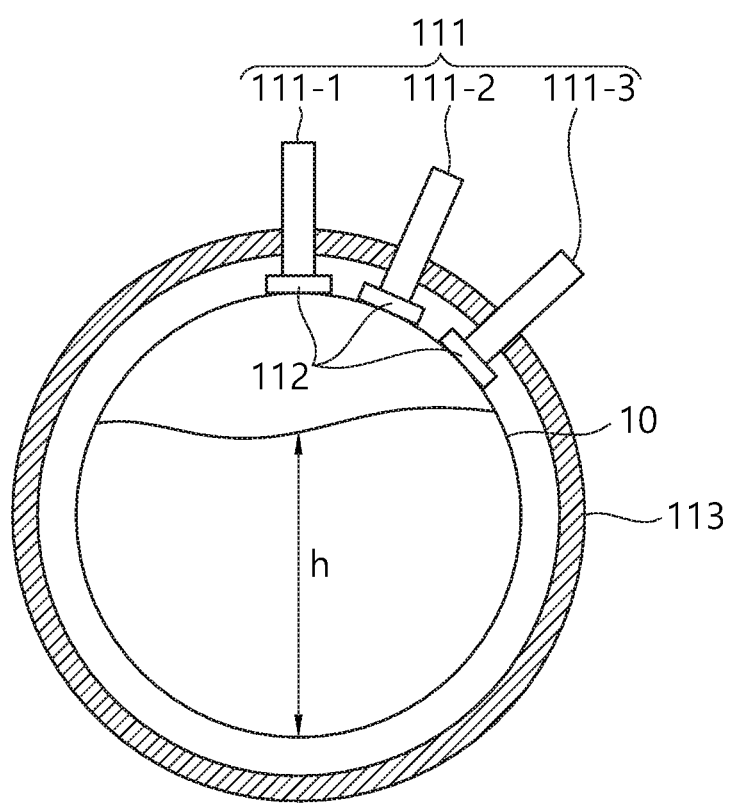
FIG. 2 shows a cross section of an ultrasonic generation unit in accordance with an embodiment.

The ultrasonic generation unit 110 generates an ultrasonic wave and transfers the ultrasonic wave to the inside of a pipe 10. In this case, the ultrasonic generation unit 110 may have a structure for effectively transferring the ultrasonic wave to the inside of the pipe 10. That is, the ultrasonic generation unit 110 has a structure which minimizes the extinction of the ultrasonic wave in order to improve the accuracy of monitoring by the examination of the ultrasonic wave. As an example for implementing such a structure, referring to FIG. 2 showing a cross section of the ultrasonic generation unit 110, the ultrasonic generation unit 110 may include at least one ultrasonic transducer 111 which generates an ultrasonic wave, a solid contact medium 112 which brings the ultrasonic transducer 111 and the pipe 10 into contact with each other and minimizes the extinction of the ultrasonic wave, and a support unit 113 which supports the ultrasonic transducer 111 so that the ultrasonic transducer 111 is accurately fixed without being shaken.

The elements of the ultrasonic generation unit 110 are described in more detail. The ultrasonic generation unit 110 includes a plurality of the ultrasonic transducers 111, and may hierarchically measure a water level h within the pipe 10. For example, in this specification, the three ultrasonic transducers 111 have been illustrated as being provided at different locations in the outside of the pipe 10. The first to third ultrasonic transducers 111-1, 111-2, and 111-3 are used to sense a water level. To this end, the ultrasonic transducers 111 are spaced apart and disposed in the outside of the pipe 10 in a vertical (or traverse section) direction and/or a horizontal (or longitudinal section) direction on the basis of the pipe 10. For example, as in FIG. 2, the ultrasonic transducers 111 may be spaced apart and disposed in the vertical direction (or the cross section of the pipe) on the basis of the pipe 10 so that the ultrasonic transducers 111 do not overlap. Furthermore, as in FIG. 3, the ultrasonic transducers 111 may be spaced apart and disposed in the horizontal direction (or the longitudinal section of the pipe) on the basis of the pipe 10 so that the ultrasonic transducers 111 do not overlap. This is for reducing interference between ultrasonic waves when the ultrasonic waves are transmitted from one side of the pipe 10, reflected by the opposite side (the other side) of the pipe 10 and then returned.

Each of the ultrasonic transducer 111 is connected to the ultrasonic examination unit 120, generates an ultrasonic wave of a specific waveform on one side of the pipe 10 by control of the ultrasonic examination unit 120, and receives an ultrasonic wave reflected by a metal layer on the opposite side (the other side) of the pipe 10 and then returned. It is to be noted that the three ultrasonic transducers 111 have been illustrated as being configured in the present embodiment, but this is only an example and two or four or more ultrasonic transducers 111 may be configured.

The solid contact medium 112 is provided on one side of the ultrasonic transducer 111, and may be formed using a material which brings the ultrasonic transducer 111 into contact with the outside of the pipe 10, but whose shape is not changed in order to minimize the extinction of an ultrasonic wave.

In relation to a material or property of the solid contact medium 112, for example, the solid contact medium may be a polymer material. For another example, the solid contact medium may be a hydrophilic polymer compound. For yet another example, the solid contact medium may be a metallic material. For example, the solid contact medium may be a metallic material having softness and may be a metallic material having stiffness and may be a metallic material having both softness and stiffness. For yet another example, the solid contact medium 112 may be a polyethylene-series ultrasonic-transmissive solid material. For yet another example, the outside cover of the solid contact medium 112 may be made of a relatively hard material, and the inside cover thereof may be made of a relatively soft material. For yet another example, the solid contact medium 112 may include one or more composite solid materials. For yet another example, the solid contact medium 112 may include a single material. In relation to a contact method and form of the solid contact medium 112, for example, the solid contact medium 112 may have a form that is coated on a surface of the pipe 10. For another example, the solid contact medium 112 may have a form that is attached to a surface of the pipe 10.

If such a solid contact medium is used, the ultrasonic transducer 111 can continue to maintain its shape without being evaporated for a long time in the state in which it has come into contact with the pipe 10, and allows the solid medium to smoothly come into contact with a target object. Furthermore, the solid contact medium 112 removes a gas pocket between the ultrasonic transducer 111 and a surface of the pipe 10. Accordingly, the attenuation of an ultrasonic wave can be minimized when the ultrasonic wave generated by the ultrasonic transducer 111 passes through the pipe 10, the scope of application of a method for examining an ultrasonic wave can be expanded, and the continuous monitoring of a water level can be realized.

The support unit 113 supports the ultrasonic transducer 111 so that it comes into contact with the pipe 10 stably, fixedly and continuously, and has an annular or ring-shaped holder and may surround some of or the entire pipe 10. That is, if the plurality of ultrasonic transducers 111 is provided at different locations on the outside of the pipe 10 in order to sense a danger range, a warning range and a normal range, a plurality of the support units 113 may be provided to individually support the ultrasonic transducers 111, respectively. However, this is only an example, and the shape or form or number of support units 113 may be implemented in various manners. If the examination of an ultrasonic wave is performed by a combination of one support unit 113 and one ultrasonic transducer 111, the combination is called a channel. A plurality of such combinations is called a multi-channel.

Figure 3:
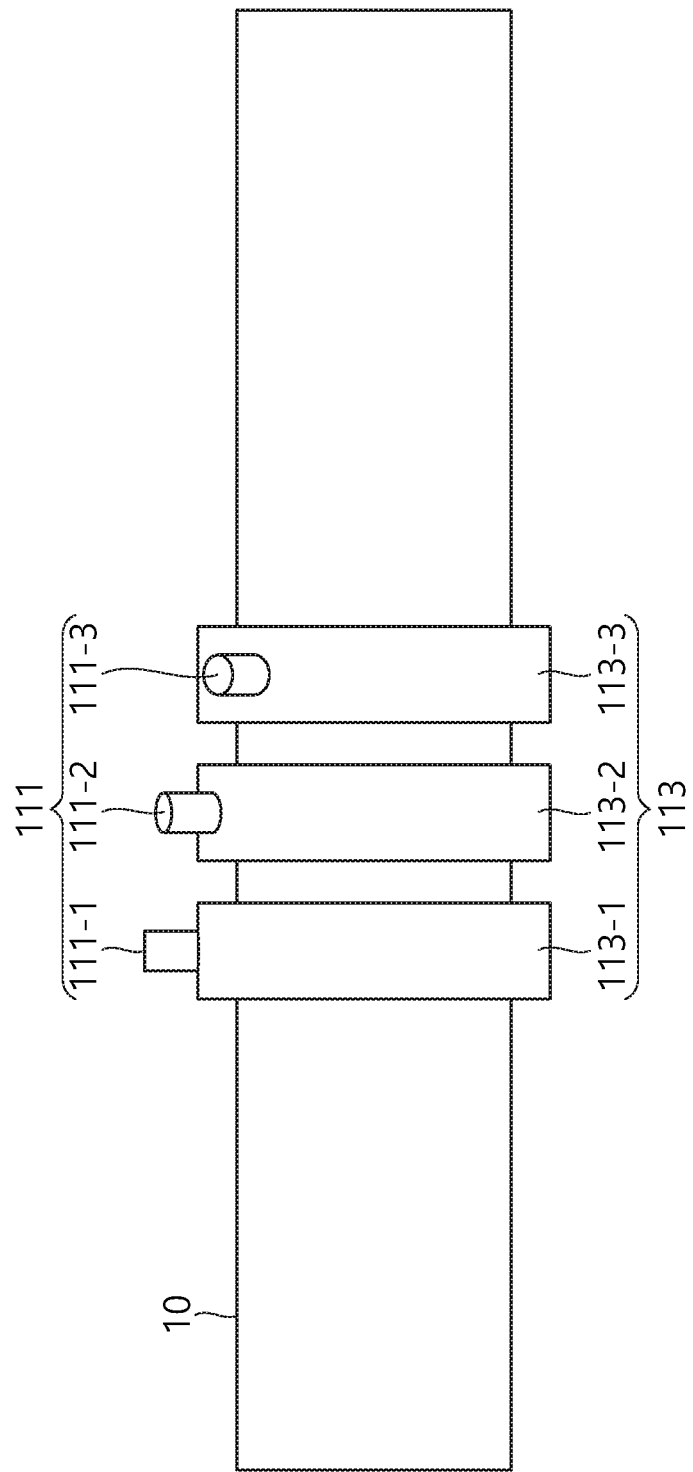
FIG. 3 is a side view in which a multi-channel has been constructed in a pipe in accordance with an embodiment.

FIG. 3 is a side view in which a multi-channel has been constructed in a pipe in accordance with an embodiment. FIG. 3 is an example in which three combinations of support units 113-1, 113-2, and 113-3 and ultrasonic transducers 111-1, 111-2, and 111-3 form a triple channel.

Referring back to FIG. 1, the ultrasonic examination unit 120 controls the transmission of an ultrasonic signal by driving the ultrasonic transducer 111 located in each channel, senses and collects the waveform of a reflected ultrasonic wave, and inputs/outputs the collected waveform. For example, the ultrasonic examination unit 120 may control an ultrasonic signal so that it is periodically (e.g., at intervals of 10 minutes), and may periodically monitor a reflective wave. Furthermore, the ultrasonic examination unit 120 is connected to the data processing unit 130, and may transmits information about the waveform of a collected ultrasonic wave to the data processing unit 130 or receive information stored or processed by the data processing unit 130.

The data processing unit 130 may determine a water level or a range to which the water level belongs based on a variety of types of information (reflective wave information, etc.) obtained from the ultrasonic examination unit 120, and may process and store information about the water level.

An ultrasonic wave has a different propagation characteristic in the solid, liquid and air region, and it is divided into an ultrasonic waveform in the gas area and an ultrasonic waveform in the liquid area. Accordingly, the ultrasonic examination unit 120 can deduce information about whether gas and liquid coexist on the internal surface of the pipe 10 or information about the results of an interaction between an ultrasonic wave and the gas area or the liquid area by monitoring and verifying the waveform of an ultrasonic wave reflected and returned from the metal layer on the opposite side of the pipe 10 after an ultrasonic wave that permeates the pipe 10 formed of the metal layer penetrates the thickness of the pipe 10 through a multi-channel. Such information is used to accurately evaluate a water level within the pipe 10.

Figure 4:
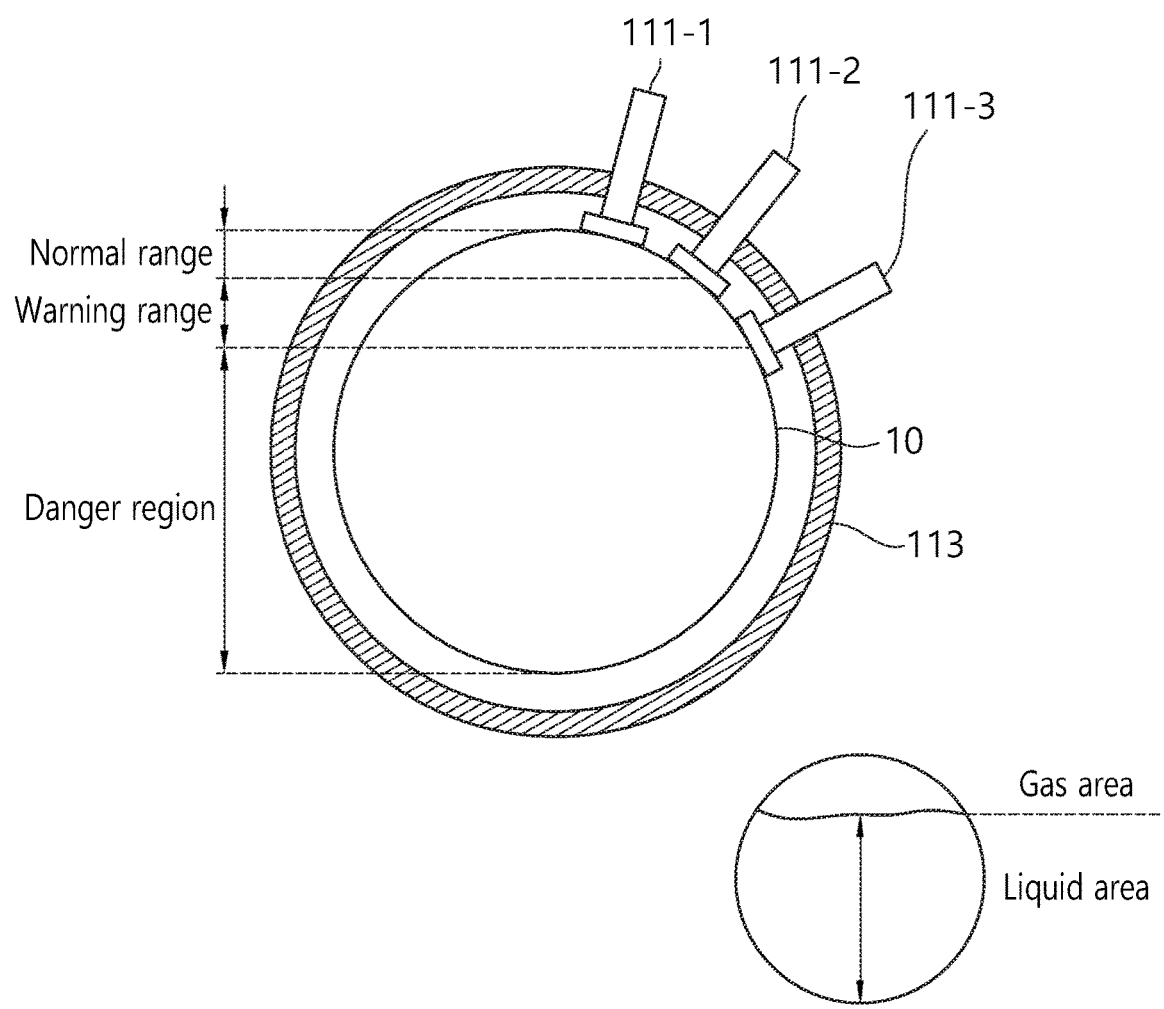
FIG. 4 is a cross-sectional view for illustrating the operating principle of the system for monitoring a water level within a pipe according to the present invention.

FIG. 4 is a cross-sectional view for illustrating the operating principle of the system for monitoring a water level within a pipe according to the present invention.

Referring to FIG. 4, when gas is accumulated within the pipe 10 of a safety-related system, a water level h may vary. In the present embodiment, the range of the water level h is defined to be three ranges: a normal range, a warning range, and a danger range. In order to hierarchically divide the water level h into the normal range, the warning range, and the danger range, the physical heights of the normal range, warning range, and danger range may be previously set. A user may select a point on the outside (or surface) of the pipe corresponding to each range set as described above and apply the set point to an on-site pipe.

Furthermore, the user places the ultrasonic transducers 111 at proper levels so that they form the plurality of ranges. Each of the ultrasonic transducers 111 may generate an ultrasonic wave and monitor the waveform of an ultrasonic wave reflected by the other side of the pipe 10 after the ultrasonic wave is transmitted from one side of the pipe 10.

The first ultrasonic transducer 111-1 is located at the highest level (reference location). The second ultrasonic transducer 111-2 is located at a level relatively lower than the highest level, that is, at the boundary of the normal range and the warning range. The third ultrasonic transducer 111-3 is located at the lowest level, that is, at the boundary of the warning range and the danger range. That is, the plurality of ranges to which water levels may belong along the cross section of the pipe 10 may be formed based on the state in which the plurality of ultrasonic transducers 111 has been spaced apart and disposed on the outside of the pipe 10. The widths of the normal range, warning range, and danger range may be different depending on the interval between the ultrasonic transducers 111 or a form in which the ultrasonic transducers 111 have been disposed.

A method for determining the water level h based on an ultrasonic wave generated by the ultrasonic transducer 111 and a reflective wave thereof is as follows.

1) A case where the water level h belongs to the normal range includes the following two cases.

i) If all of the ultrasonic transducers 111 come into contact with the liquid area—ultrasonic waves generated by all of the ultrasonic transducers 111 are reflected without being attenuated and returned to the ultrasonic transducers 111 again. In this case, the reflected and returned waveforms may be monitored in a Gaussian form. Accordingly, when the reflective waves from all of the ultrasonic transducers 111 are monitored, the system 100 for monitoring a water level within a pipe determines that the water level h belongs to the normal range.

ii) If the first ultrasonic transducer 111-1 comes into contact with the gas area and the second ultrasonic transducer 111-2 and the third ultrasonic transducer 111-3 come into contact with the liquid area—the reflective wave of an ultrasonic wave generated by the first ultrasonic transducer 111-1 is not monitored. In contrast, the reflective waves of ultrasonic waves generated by the second ultrasonic transducer 111-2 and the third ultrasonic transducer 111-3 are reflected without being attenuated and returned. Accordingly, the system 100 for monitoring a water level within a pipe determines that the water level h belongs to the normal range up to at least a point at which the second ultrasonic transducer 111-2 monitors the reflective wave.

2) A case where the water level h belongs to the warning range corresponds to a case where the first ultrasonic transducer 111-1 and the second ultrasonic transducer 111-2 come into contact with the gas area and the third ultrasonic transducer 111-3 comes into contact with the liquid area. The reflective waves of ultrasonic waves generated by the first ultrasonic transducer 111-1 and the second ultrasonic transducer 111-2 are not monitored. In contrast, the reflective wave of an ultrasonic wave generated by the third ultrasonic transducer 111-3 is reflected without being attenuated and returned. Accordingly, the system 100 for monitoring a water level within a pipe determines that the water level h belongs to the warning range up to at least a point at which the third ultrasonic transducer 111-3 monitors the reflective wave.

3) A case where the water level h belongs to the danger range corresponds to a case where all of the first ultrasonic transducer 111-1, the second ultrasonic transducer 111-2, and the third ultrasonic transducer 111-3 come into contact with the gas area. Accordingly, the reflective waves of ultrasonic waves generated by the first ultrasonic transducer 111-1, the second ultrasonic transducer 111-2, and the third ultrasonic transducer 111-3 are not monitored. Accordingly, the system 100 for monitoring a water level within a pipe determines that the water level h belongs to the danger range from a point of time at which all of the ultrasonic transducers 111 do not monitor the reflective waves.

Figure 5:
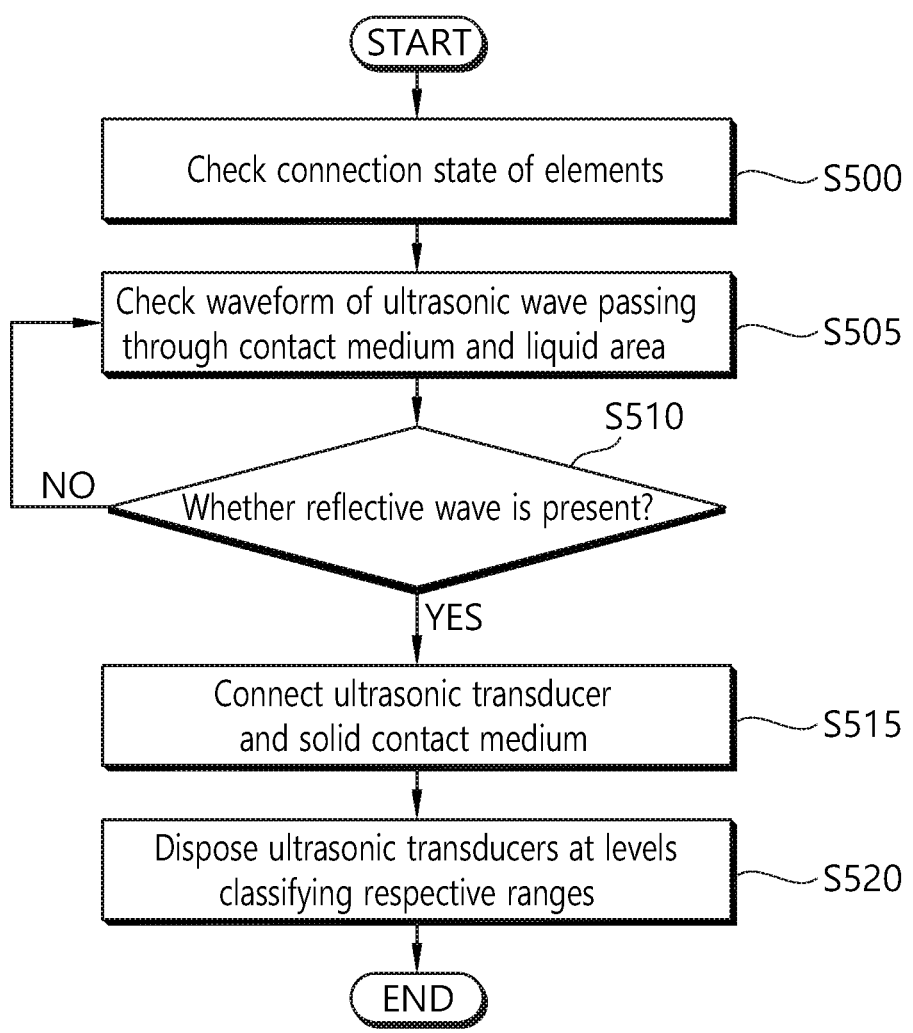
FIG. 5 is a flowchart illustrating a method for configuring the system for monitoring a water level within a pipe according to an embodiment of the present invention.

FIG. 5 is a flowchart illustrating a method for configuring the system for monitoring a water level within a pipe according to an embodiment of the present invention.

Referring to FIG. 5, the method for installing the system 100 for monitoring a water level within a pipe on the pipe 10 includes step S500 of checking the connection state of the at least one ultrasonic transducer 111+ the solid contact medium 112+ the ultrasonic examination unit 120, step S505 of checking the waveform of an ultrasonic wave that is generated by the ultrasonic transducer 111 and that then passes through the solid contact medium 112 and the liquid area, and step S510 of checking whether the reflective wave of an ultrasonic wave is present in the liquid area or not. For example, at the early stage of installation, a user may check whether the connection state of the elements is corrected by monitoring the waveform of an ultrasonic wave that is generated by the ultrasonic transducer 111 and that is reflected through the solid contact medium 112 and the liquid area. Furthermore, in the method for monitoring a water level according to the present embodiment, it is necessary to prevent an error of information for reliability of the system because accurately checking whether a reflective wave is present or not is an important factor in determining a water level within a pipe.

If a reflective wave in the liquid area is not checked at step S510, step S505 is performed. In contrast, if a reflective wave in the liquid area is checked, a user connects the ultrasonic transducer 111 and the solid contact medium 112 (S515), selects points on a surface of the pipe by which the normal range, warning range, and danger range of the water level are classified, and disposes the ultrasonic transducers 111 at levels that classify the respective ranges (S520).

As described above, the system for monitoring a water level within a pipe according to the present embodiment can perform the monitoring of a water level within a pipe on a long term basis in a nondestructive manner in relation to the accumulation of gas in a safety-related system, does not apply a physical change to the shape of a pipe and a power plant system, enables the installation and on-site application of the system to be very simple, and can continue to construct a database for a water level within a pipe through an accumulated system.

Figure 6:
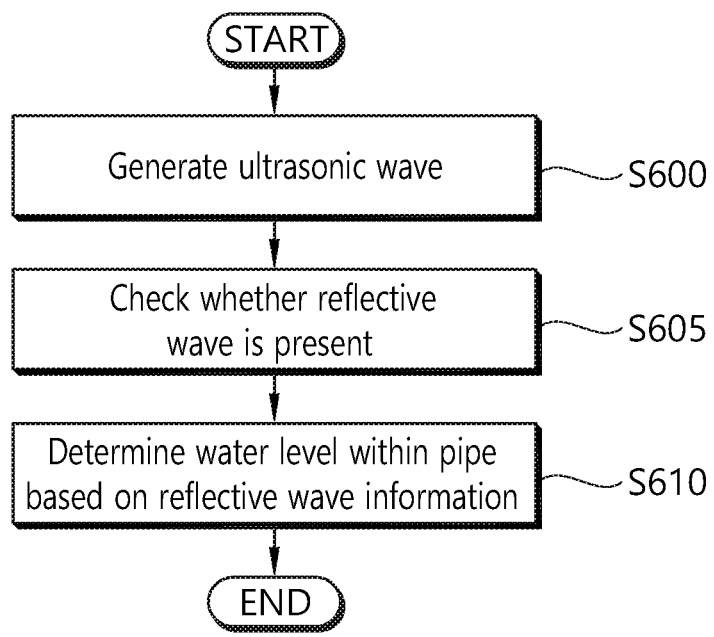
FIG. 6 is a flowchart illustrating an operating method of the system for monitoring a water level within a pipe according to an embodiment of the present invention.

FIG. 6 is a flowchart illustrating an operating method of the system for monitoring a water level within a pipe according to an embodiment of the present invention.

Referring to FIG. 6, the system 100 for monitoring a water level within a pipe generates ultrasonic waves using the ultrasonic transducers 111 of a multi-channel (S600). The ultrasonic waves generated by the ultrasonic transducer 111 are transmitted to the inside of the pipe 10 through the solid contact medium 112.

The system 100 for monitoring a water level within a pipe checks whether the reflective waves of the ultrasonic waves of the respective ultrasonic transducers 111-1, 111-2, and 111-3 are present or not (S605).

The system 100 for monitoring a water level within a pipe determines a water level within the pipe 10 based on information about the reflective waves of the ultrasonic waves of the ultrasonic transducers 111-1, 111-2, and 111-3 (S610). In this case, the information about the reflective waves is information about a combination of the presence and non-presence of the reflective waves.

A method for determining a water level within the pipe 10 by combining the presence and non-presence of the reflective waves of the respective ultrasonic transducers is described below with reference to FIG. 4.

TABLE 1

| Water level within pipe | Whether reflective wave of ultrasonic wave of first ultrasonic transducer is present or not | Whether reflective wave of ultrasonic wave of second ultrasonic transducer is present or not | Whether reflective wave of ultrasonic wave of third ultrasonic transducer is present or not |
|---|---|---|---|
| Normal range | ○ | ○ | ○ |
|  | X | ○ | ○ |
| Warning range | X | X | ○ |
| Danger range | X | X | X |

Referring to Table 1, if the reflective waves of the ultrasonic waves of all of the ultrasonic transducers 111 are checked to be present or if the reflective waves of the ultrasonic waves of the remaining ultrasonic transducers other than the first ultrasonic transducer 111-1 are checked to be present, the system 100 for monitoring a water level within a pipe determines that a water level within the pipe belongs to the normal range.

Furthermore, if only the reflective wave of the ultrasonic wave of the third ultrasonic transducer 111-3 is checked to be present, the system 100 for monitoring a water level within a pipe determines that a water level within the pipe belongs to the warning range.

Furthermore, if the reflective waves of the ultrasonic waves of all of the ultrasonic transducers 111 are checked to be not present, the system 100 for monitoring a water level within a pipe determines that a water level within the pipe belongs to the danger range.

The method for monitoring a water level within a pipe according to the present embodiment may further include the step of storing information about the determined water level within the pipe in a database.

As described above, efficiency of an operation is enhanced because a water level within a pipe can be continuously monitored while efficiently reducing the time taken to check a power plant through long-distance monitoring without directly measuring the pipe. Furthermore, excessive air can be prevented from being accumulated by continuously monitoring an air accumulation phenomenon related to the safety-pending issue of the accumulation of gas, and safety is enhanced because a water level within a pipe can be monitored without a direct change in the design of a power plant system.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technological spirit of the present invention, but should be construed as illustrating the technological spirit of the present invention. The scope of the technological spirit of the present invention is not restricted by the embodiments, and the range of protection of the present invention should be interpreted based on the following appended claims. Accordingly, the present invention should be construed as covering all modifications or variations derived from the meaning and scope of the appended claims and their equivalents.

The invention claimed is:

1. A system for monitoring a water level within a pipe, comprising:
    an ultrasonic generation unit comprising two or more ultrasonic transducers which are disposed at spaced locations on an outside of the pipe and generates an ultrasonic wave, a solid contact medium which is provided on one side of the ultrasonic transducers and brings the ultrasonic transducers into contact with the outside of the pipe, and a support unit which supports the ultrasonic transducers so that the transducers fixedly come into contact with the outside of the pipe;
    an ultrasonic examination unit which controls the generation of the ultrasonic wave by driving the ultrasonic transducers, detects a reflective wave of the ultrasonic wave, collects information about the reflective wave, and inputs/outputs the information; and a data processing unit which determines a water level based on the information about the reflective wave and processes or stores the information about the water level, wherein a plurality of ranges are formed by at least one cross section of the pipe, based on a disposition of the ultrasonic transducers in a vertical direction on the outside of the pipe, wherein the data processing unit determines a range which belongs to the plurality of ranges and to which the water level belongs, wherein the ultrasonic transducers comprise first to third ultrasonic transducers, wherein the first to the third ultrasonic transducers are sequentially disposed from a highest level to a lower side along the outside of the pipe, the plurality of ranges comprises a normal range, a warning range, and a danger range, and wherein when the ultrasonic examination unit detects all of the reflective waves of the ultrasonic waves of the first to third ultrasonic transducers or detects only the reflective waves of the ultrasonic waves of the second and third ultrasonic transducers, the data processing unit determines that the water level belongs to the normal range.

2. The system of claim 1, wherein when the ultrasonic examination unit detects only a reflective wave of an ultrasonic wave of the third ultrasonic transducer, the data processing unit determines that the water level belongs to the warning range.

3. The system of claim 1, wherein when the ultrasonic examination unit does not detect any of reflective waves of ultrasonic waves of the first to third ultrasonic transducers, the data processing unit determines that the water level belongs to the danger range.

4. The system of claim 1, wherein the ultrasonic transducers are spaced apart in a horizontal direction on the outside of the pipe.

5. The system of claim 1, wherein the support unit has an annular or a ring-shaped holder and completely or partly surrounds the pipe.

6. The system of claim 1, wherein the solid contact medium is a polyethylene-series ultrasonic-transmissive solid material and coated on a surface of the pipe.

7. The system of claim 1, wherein the solid contact medium has a form attached to a surface of the pipe.

8. A system for monitoring a water level within a pipe, comprising:

an ultrasonic generation unit which transmits ultrasonic waves to an inside of the pipe through multiple separated channels, wherein each of the channels comprises two or more ultrasonic transducers generating ultrasonic waves, a solid contact medium provided on one side of the ultrasonic transducers, and a support unit having a ring shape that surrounds an outside of the pipe and fixedly supporting the ultrasonic transducers;

an ultrasonic examination unit which controls the transmission of the ultrasonic waves through the multiple channels, detects reflective waves of the ultrasonic waves, collects information about the reflective waves, and inputs/outputs the information; and a data processing unit which determines a water level based on the information about the reflective waves and processes or stores information about the water level, wherein a plurality of ranges are formed by at least one cross section of the pipe, based on a disposition of the ultrasonic transducers in a vertical direction on the outside of the pipe, wherein the data processing unit determines a range which belongs to the plurality of ranges and to which the water level belongs, wherein the ultrasonic transducers comprise first to third ultrasonic transducers, wherein the first to the third ultrasonic transducers are sequentially disposed from a highest level to a lower side along the outside of the pipe, wherein the plurality of ranges comprises a normal range, a warning range, and a danger range, and wherein when the ultrasonic examination unit detects all of the reflective waves of the ultrasonic waves of the first to third ultrasonic transducers or detects only the reflective waves of the ultrasonic waves of the second and the third ultrasonic transducers, the data processing unit determines that the water level belongs to the normal range.

9. The system of claim 8, wherein when the ultrasonic examination unit detects only a reflective wave of an ultrasonic wave of the third ultrasonic transducer, the data processing unit determines that the water level belongs to the warning range.

10. The system of claim 8, wherein when the ultrasonic examination unit does not detect any of reflective waves of ultrasonic waves of the first to third ultrasonic transducers, the data processing unit determines that the water level belongs to the danger range.

11. The system of claim 8, wherein the ultrasonic transducers are spaced apart in a horizontal direction on the outside of the pipe.

12. The system of claim 8, wherein the solid contact medium is a polyethylene-series ultrasonic-transmissive solid material and coated on a surface of the pipe.

* * * * *